(12) United States Patent
Jain et al.

(10) Patent No.: US 12,114,198 B2
(45) Date of Patent: *Oct. 8, 2024

(54) PRIORITIZING WIRELESS ACCESS TECHNOLOGIES IN AN ENTERPRISE FABRIC

(71) Applicant: Cisco Technology, Inc., San Jose, CA (US)

(72) Inventors: Prakash C. Jain, Fremont, CA (US); Sanjay K. Hooda, Pleasanton, CA (US); Vinay Saini, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,392

(22) Filed: Jul. 26, 2023

(65) Prior Publication Data

US 2023/0370886 A1 Nov. 16, 2023

Related U.S. Application Data

(63) Continuation of application No. 17/443,301, filed on Jul. 23, 2021, now Pat. No. 11,785,493.

(51) Int. Cl.
*H04W 28/02* (2009.01)
*H04L 12/46* (2006.01)
*H04W 84/12* (2009.01)
*H04W 88/08* (2009.01)

(52) U.S. Cl.
CPC ..... *H04W 28/0226* (2013.01); *H04L 12/4633* (2013.01); *H04W 84/12* (2013.01); *H04W 88/08* (2013.01)

(58) Field of Classification Search
CPC ............ H04W 28/0226; H04W 84/12; H04W 88/08; H04W 84/10; H04L 12/4633
See application file for complete search history.

(56) References Cited

U.S. PATENT DOCUMENTS

| 11,785,493 B2 * | 10/2023 | Jain ................... H04W 28/0226 370/338 |
| 2019/0380037 A1 * | 12/2019 | Lifshitz ............... H04L 41/0893 |
| 2020/0204483 A1 * | 6/2020 | Jain ........................ H04L 45/64 |
| 2020/0344662 A1 * | 10/2020 | Maino ................... H04L 43/028 |
| 2021/0144538 A1 * | 5/2021 | Gundavelli ............ H04W 4/06 |
| 2021/0185752 A1 * | 6/2021 | Samuel ............... H04L 63/0272 |
| 2022/0407897 A1 * | 12/2022 | Raghuvanshi ...... H04L 41/0663 |

* cited by examiner

*Primary Examiner* — Abdullahi Ahmed
(74) *Attorney, Agent, or Firm* — Patterson + Sheridan, LLP

(57) ABSTRACT

An enterprise network may receive a WiFi packet associated with a 5G service (or other type of service) at an access point (AP) in the enterprise network. The enterprise network determines whether the WiFi packet satisfies a first-packet policy associated with the 5G service, where the first-packet policy controls access to a tunnel for traversing the enterprise network to reach the 5G service. If the packet satisfies the policy, the enterprise network queries a map server to identify a location of a 5G border in the enterprise network that is connected to the 5G service. The enterprise network can transmit the WiFi packet on the tunnel with priority to meet SLA using the location of the 5G border.

20 Claims, 4 Drawing Sheets

PRIORITIZING WIRELESS ACCESS TECHNOLOGIES IN AN ENTERPRISE FABRIC

CROSS-REFERENCE TO RELATED APPLICATIONS

This application is a continuation of co-pending U.S. patent application Ser. No. 17/443,301 filed Jul. 23, 2021. The aforementioned related patent application is herein incorporated by reference in its entirety.

TECHNICAL FIELD

Embodiments presented in this disclosure generally relate to wireless communications. More specifically, embodiments disclosed herein offer prioritized access of a WiFi device to a 5G service using an established enterprise network.

BACKGROUND

Wireless communications provide access to the internet over a 5G network using devices that can be WiFi or WiFi6 5G enabled. Users connecting to 5G networks are provided with an enhanced user experience, due to higher bandwidth and higher speed. Wireless communications have become a crucial element to how people live their lives, and increased access to higher speed has become a priority.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
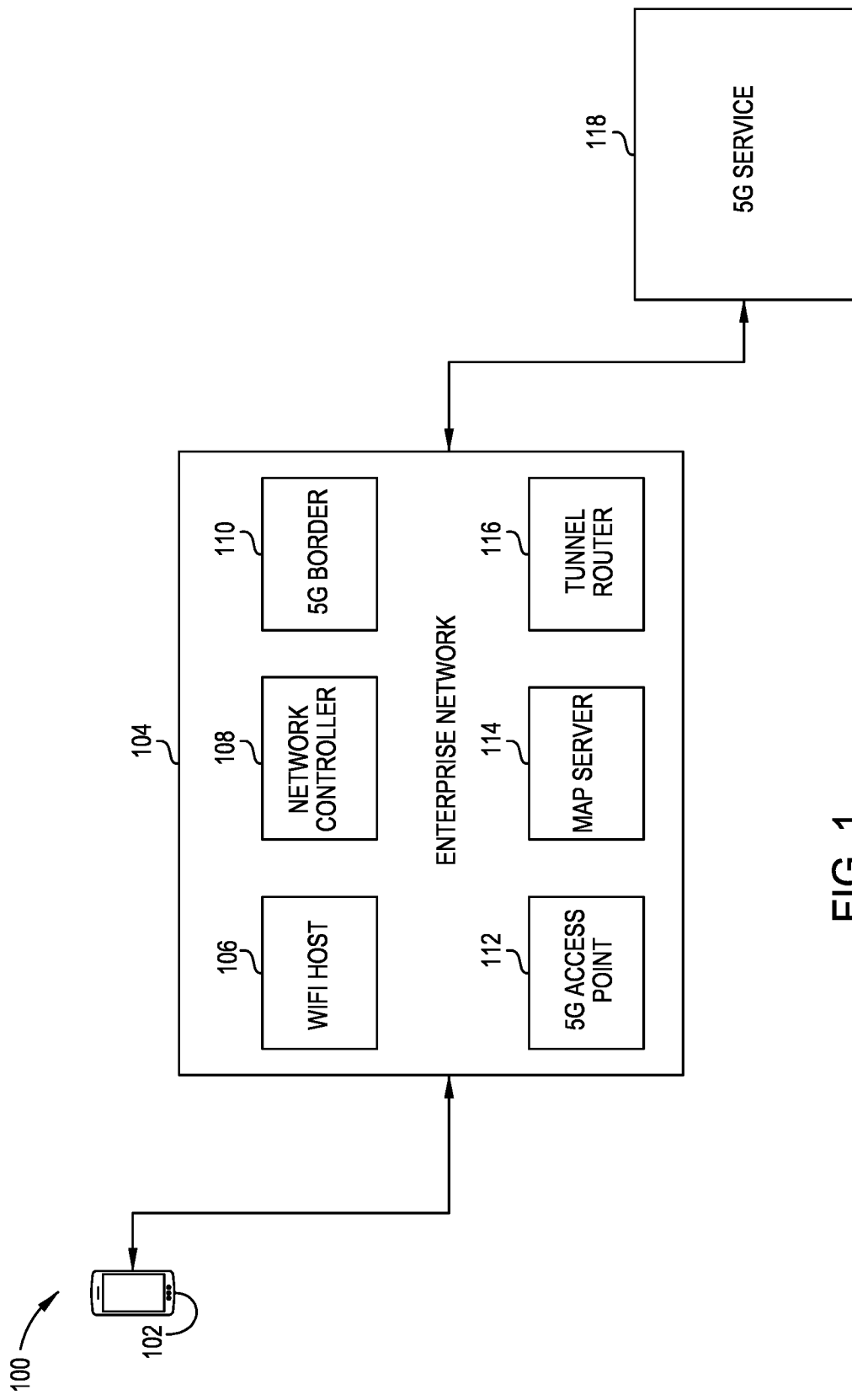
FIG. 1 is a block diagram illustrating an example physical architecture of an enterprise network, in accordance with certain aspects of the present disclosure.

One embodiment presented in this disclosure is a method that includes receiving a WiFi packet associated with a 5G service at an access point (AP) in an enterprise network. The method also includes determining that the WiFi packet satisfies a first-packet policy associated with the 5G service, wherein the first-packet policy controls access to a tunnel for traversing the enterprise network to reach the 5G service. The method also includes querying a map server to identify a location of a 5G border in the enterprise network that is connected to the 5G service. The method also includes transmitting the WiFi packet on the tunnel using the location of the 5G border.

Other embodiments include a computing system and a non-transitory computer readable medium having program instructions for performing an operation which includes receiving a WiFi packet associated with a service at an access point (AP) in an enterprise network where the service is accessible using a different network than the enterprise network. The operation also includes determining that the WiFi packet satisfies a first-packet policy associated with the service, wherein the first-packet policy controls access to a tunnel for traversing the enterprise network to reach the service. The operation also includes querying a map server to identify a location of a border in the enterprise network that is connected to the service. The operation also includes transmitting the WiFi packet on the tunnel using the location of the border.

Example Embodiments

Embodiments herein provide prioritized access of a WiFi device to a 5G service using an enterprise network.

5G services provide additional security, efficiency, speed, bandwidth, and high performance. Even without being in an enterprise building, a user can access 5G service with a WiFi enabled device. This allows a lower cost WiFi access device to utilize 5G services. An established enterprise network provides a structure to provide a tunnel for users to access 5G applications or services, no matter if they are in the building operating the enterprise network or not. While the embodiments below specifically discuss services accessible via a 5G cellular network, they can also include services accessible by other types of cellular networks such as a 4G or 3G network, or alternatively fiber/cable networks.

For a user to have an enhanced end-to-end experience with higher bandwidth and speed, the user can rely on the coexistence of low-cost WiFi access and 5G applications or services. One example of the low-cost WiFi access is WiFi6/7; however, this only one version of access.

As stated, the physical location of the WiFi device should not be a barrier to access of 5G applications or services. However, the replacement of established enterprise networks with new enterprise networks with 5G connectivity may not be feasible or cost-effective. New WiFi devices can go through existing networking devices (e.g., switches and routers for transport, security, policy enforcement mechanisms) in the enterprise network to connect to 5G applications or services. This established enterprise network can provide individuals access to high speed, secured connectivity virtually and from anywhere. One embodiment described herein includes an on-demand SLA guaranteed overlay tunnel that offers prioritized access of a WiFi device to a 5G service using the established enterprise network. Relying on a locator ID separation protocol (LISP), or any pull-based protocol, a tunnel is created between the WiFi device and a 5G border in the enterprise network that is connected to the 5G service. The embodiments herein can be used to create a tunnel providing access to 5G services over the current enterprise network that is not yet 5G capable or compatible. Before creating the tunnel, the 5G border registers with a map server (e.g., a LISP map server), informing the map server that it is the service border for that 5G service. When the WiFi host is booted, the map server provides it with a first-packet policy indicating what types of devices or packets are allowed to use the tunnel. When a first WiFi packet (which is to be processed by a 5G enterprise application) is detected from the WiFi host, a tunnel router (e.g., a LISP egress tunnel router) determines whether it matches the first-packet policy. If so, the tunnel router requests information from the map server about the 5G border for the 5G enterprise application. The map server provides the special 5G border, which provides the tunnel connectivity. At this point, the tunnel is formed and established. Once the WiFi wireless access packet is assigned based on its priority, the tunnel connects this packet to the 5G services. The tunnel can be cleared and disconnected when no wireless access packets are detected.

FIG. 1 illustrates an example communication system 100 in which aspects of the present disclosure may be performed. The communication system 100 includes a WiFi device 102 that communicates with a WiFi host 106 in the enterprise network 104. The WiFi devices 102 can be any computing device such as a smartphone, tablet, desktop computer, and the like. In one embodiment, the WiFi devices 102 are compatible with WiFi6/7, or future WiFi protocol. WiFi6/7 devices offer a larger range, bandwidth, and superior quality of wireless connection, as compared to previous WiFi connectivity, due to new frequencies being researched and implemented.

In one embodiment, the WiFi host 106 is an access point (AP) or access switch that permits the WiFi device 102 to communicate with the other elements in the enterprise network 104. The network controller 108 configures the 5G border 110. In one embodiment, the tunnel router 116 is a LISP egress tunnel router (xTR). This tunnel router, however, is not limited to LISP applications. Additionally, the network controller 108 triggers the tunnel router 116 on the 5G border 110 to confirm the 5G border 110 has a 5G service 118. In one embodiment, the network controller 108 is a WLAN controller or a software application that monitors and configures the various network elements in the enterprise network 104.

The 5G service 118 can include applications, servers, and cloud services. A map server 114, which may be a map server configured for LISP or any pull-based protocol, registers the 5G border 110, and the tunnel router 116 creates a tunnel for the WiFi device 102 to access 5G service 118. Moreover, instead of service 118 accessible using 5G, the embodiments herein can be applied to a service accessible using 4G, 3G, or a high speed fiber or cable network.

In the discussion below, it is assumed the WiFi device 102 is attempting to access or use the 5G service 118. However, in previous implementations, the WiFi device 102 can only access the 5G service 118 if it is 5G-enabled. Not all devices have 5G capability, and therefore, without the use of an established enterprise network 104, the WiFi device 102 cannot easily access 5G service 118. Using the enterprise network 104, the WiFi device 102 is given access to 5G service 118 through the network controller 108 communicating with map server 114 in conjunction with the 5G border 110 and 5G access point 112. Through this communication, the WiFi device 102 is mapped to a 5G border 110. Further, the network controller 108 can establish a tunnel through the enterprise network 104 that the WiFi device 102 can use to communicate with the 5G service 118, where the tunnel provides a lower latency when traversing the enterprise network 104. Not all WiFi devices 102 may be authorized or permitted to use this tunnel, in which case they would have to rely on a different communication path to communicate with the 5G service 118 through the enterprise network 102. Stated differently, the network controller 108 can permit only high-priority WiFi devices 102 or WiFi traffic to use the tunnel when communicating with the 5G service 118 while lower priority WiFi devices 102 may use slower communication paths through the enterprise network 102. As discussed below, the enterprise network 102 can use a first-packet policy to control access to the tunnel.

Figure 2:
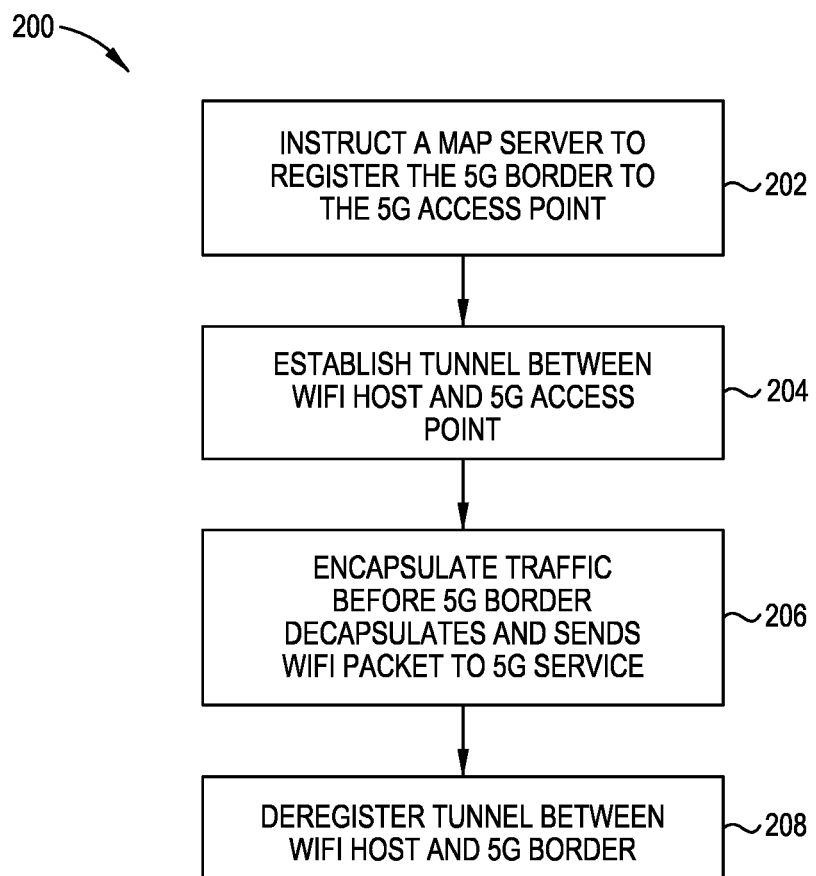
FIG. 2 is a flowchart for providing prioritized access of a WiFi device to a 5G service, in accordance with certain aspects of the present disclosure.

FIG. 2 illustrates the example operation 200 performed by the communication system (e.g., the communication system 100 in FIG. 1), which occurs after receiving a request, that satisfies the first-packet policy of the system, from a WiFi device (e.g., the WiFi device 102 in FIG. 1) to access a 5G service (e.g., the 5G service 118 in FIG. 1).

At 202, the network controller (e.g., the network controller 108 in FIG. 1) instructs a map server (e.g., the map server 114 in FIG. 1) for an enterprise network (e.g., the enterprise network 104 in FIG. 1) to register the 5G border (e.g., the 5G border 110 in FIG. 1) to the 5G access point (e.g., the 5G access point 112 in FIG. 1). When the WiFi device attempts to access the 5G service, the network controller configures the 5G border by receiving the map registration from the map server. The network controller then configures the 5G border and triggers the tunnel router (e.g., the tunnel router 116 in FIG. 1) to confirm that the 5G border is in fact connected to the 5G service.

At 204, the tunnel router establishes a tunnel between the WiFi host (e.g., the WiFi host 106 in FIG. 1) and the 5G access point. To accomplish this, the WiFi host joins in with the tunnel router, and the tunnel router requests that the map server resolve the 5G border for the 5G service. After the map server identifies the 5G border for the service, the IDs or locations for the 5G border and the 5G service are sent to the tunnel router. The map server receives a map request from the tunnel router and checks to ensure the 5G service meets the first-packet policy and responds with a destination address. The first-packet policy determines whether the WiFi packets are permitted to use an overlay tunnel through the enterprise network to reach the 5G service. In one embodiment, the map server determines whether the WiFi packet destined for the 5G service meets the first-packet policy. This policy can be based on parameters including wide area network link type and technologies, application identities, application access and authorization policies (e.g., a security group tag), and any service legal agreements (SLAs) (e.g., bandwidth, packet delay, and packet drop parameters). Moreover, the packet's destination may affect the policy's application.

At 206, the tunnel router encapsulates the WiFi traffic and transmits the traffic using the tunnel. The 5G border decapsulates and sends the WiFi packets to the 5G access point and on to the 5G service. The process can work in reverse for packets received from 5G service which are then transmitted, using the tunnel, to the WiFi device.

After the tunnel router receives a reply from the map server, the tunnel router installs a map-cache that includes a first-packet policy, a 5G service routing locater, and a 5G service instance-ID. Using the map-cache, the 5G border encapsulates and sends the WiFi packet to the tunnel router. The tunnel router then decapsulates the 5G border and sends the WiFi packet to the WiFi host.

At 208, the enterprise network deregisters the tunnel between the WiFi host and the 5G border. In one embodiment, the enterprise network determines to deregister the tunnel when there are no more WiFi packets that meet the first-packet policy seen accessing the tunnel. The tunnel router is cleared and disconnected from the 5G border when no WiFi packets are detected over the tunnel. The 5G access point withdraws the route, and the 5G border disconnects from the tunnel router, and no more traffic can flow through the tunnel.

Figure 3:
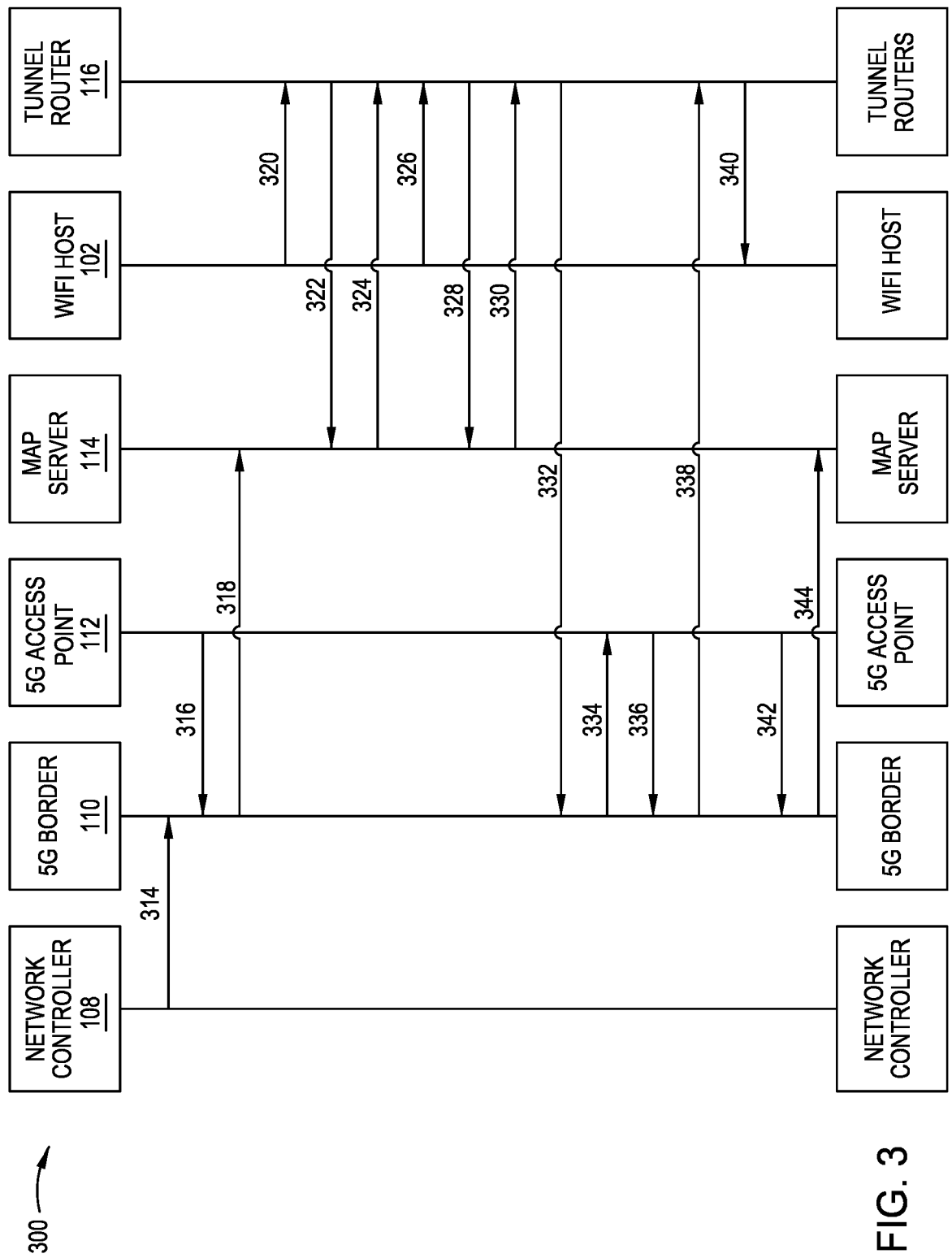
FIG. 3 is a diagram illustrating an example logical architecture of an enterprise network, in accordance with certain aspects of the present disclosure.

FIG. 3 illustrates an example communication system 100 in which aspects of the present disclosure may be performed. On-demand overlay protocols like LISP enable the creation of tunnels to provide prioritized access through an enterprise network. Instead of a creating the tunnel when the first packet is detected on the WiFi host going towards any destination, in the embodiments herein, the tunnel is created when a WiFi packet is detected that is going to a particular 5G service. Moreover, this communication system can be accomplished over any pull-based protocol, including, but not limited to, LISP or border gateway protocol (BGP-EVPN).

At 314, the network controller 108 instructs the 5G border 110 to register as a service border for the 5G service 118 (not shown in FIG. 3) it is connected to. Specifically, the network controller 108 instructs the 5G border 110 to register with the map server 114 so the map server 114 knows that the 5G border 110 is the interface for the enterprise network 104 when communicating with the 5G service 118. As part of this registration, the network controller 108 establishes the first-packet policy that is used to evaluate received WiFi packets to determine whether they should be prioritized.

In one embodiment, if a packet that is destined to be used solely for a business critical operation, the WiFi packet is given priority to use the tunnel by the first-packet policy. However, if the packet is destined for general internet use, is not business critical, or does not originate from a high-priority user, the first-packet policy does not permit the packet to use the higher-priority tunnel in order to communicate with 5G service, but will have to rely on a different communication path through the enterprise network. For example, if the CEO is attempting to access a business critical 5G service at the same time as a guest is attempting to connect to the same 5G service, the CEO's use will be prioritized over the guest of the enterprise network so that the CEO's traffic uses the tunnel to access the 5G service but the guest's traffic does not. As a further example, if an employee is attempting to access secure information for business use at the same time an employee is attempting to access his personal e-mail (which may both be associated with a 5G service), the WiFi packet of the employee attempting to access secure information may be permitted to use a tunnel to the corresponding 5G service while the traffic associated with her personal email does not use a tunnel to reach a 5G service.

At 316, the 5G border 110 receives the 5G route for the WiFi packet from the 5G access point 112. In one embodiment, this route indicates the connection between the service virtual routing and forwarding (VRF) and the 5G border 110. The 5G border 110 monitors the 5G interface and routes and registers the map server 114 in the service VRF. At 318, the map server 114 receives the map registration of the tunnel router 116 and 5G service 118 that are mapped to the map server 114 from the 5G border 110. In one embodiment, these registrations are inserted into the service insertion table as a service egress tunnel router (ETR).

At 320, the WiFi host 106 joins the enterprise network and begins communicating with the tunnel router 116. This WiFi host 106 includes the WiFi packet attempting to access 5G service 118. The WiFi packet is identified as coming from WiFi and is indicated with its destination. At 322, the tunnel router 116 asks the map server 114 to resolve the service border for the 5G service 118. The map server determines if the WiFi packet being received from the WiFi host 106 meets the first-packet policy or not. If it does not meet the policy, the traffic is not allowed to use a tunnel to communicate with the 5G service 118. As previously mentioned, the first-packet policy gives priority to certain devices and users attempting to connect to the 5G service 118. If two packets enter at the same time, but one has priority over the other as determined by the first-packet policy, the prioritized packet will gain access to the tunnel in order to reach the 5G service 118. If it does meet the policy, the remaining steps in FIG. 3 are performed. At 324, the map server 114 responds to the request from the tunnel router 116. This response includes the 5G service border and the instance-ID for the 5G service 118. The tunnel router 116 then creates a tunnel towards the 5G service 118.

At 326, the WiFi host 106 sends the tunnel router 116 the 5G route, the packet destined for the 5G path or service, accessing 5G services via the tunnel (e.g., the traffic in subnet 10/8 for the destination in 20/8). This 5G route is formed from the 5G service border and 5G service instance-ID. At 328, the tunnel router 116 requests a 5G service map for the destination from the map server 114. The map server 114 looks in the service insertion table of the source instance, which has the 5G insertion policy configured. The map server 114 locates the destination address from the service insertion policy table. At 330, the map server 114 responds to this request from the tunnel router 116. In one embodiment, the map server 114 replies with the service-ETR of the 5G service 118, 5G service instance-ID, destination's security group tag (DGT) for 5G service 118, and differentiated service code point (DSCP) values for the service-level agreement. Upon receiving the reply, in one embodiment, the tunnel router 116 installs a map-cache with the 5G service 118 routing locators, which includes the 5G service 118 instance-ID, DGT, and DSCP values.

At 332, the tunnel router 116 encapsulates the traffic with encapsulation parameters. This encapsulated traffic is then sent to the 5G border 110. At 334, the 5G border 110 decapsulates the traffic and sends the WiFi packet to the 5G access point 112. Although not shown in FIG. 3, the 5G access point 112 forwards the packets to the 5G service.

For return traffic, at 336, the 5G access point 112 sends the WiFi packet to the 5G border 110 through service VRF. That is, the 5G access point 112 receives a reply from the 5G service 118 which is destined for the WiFi device which is then transmitted to the WiFi device using the tunnel. At 338, using the map-cache, the 5G border 110 encapsulates the traffic. This encapsulated traffic and WiFi packet is sent to the tunnel router 116 using the same tunnel which was used to transmit the packets to the 5G service. At 340, the tunnel router 116 decapsulates the traffic and sends the WiFi packet to the WiFi host 106.

The WiFi device may complete its need to access the 5G service 118. The network controller 302 monitors the traffic in the tunnel and determines the tunnel has not been used for a pre-determined amount of time. To save resources in the enterprise network 104, the network controller 302 may determine to deregister the tunnel. At 342, the 5G access point 112 withdraws the routes from the 5G border 110. When these routes are withdrawn, the tunnel cannot be accessed without completing the process again (e.g., repeating blocks 320-326). However, if the same WiFi device (or a different WiFi device that also satisfies the first-packet policy) continues to transmit traffic to the 5G service, the tunnel is maintained. At 344, the 5G border 110 deregisters the service-ETR from the map server 114. The map server 114 is cleared, and the 5G tunnel is disconnected. After this, no traffic can pass through the 5G tunnel.

Figure 4:
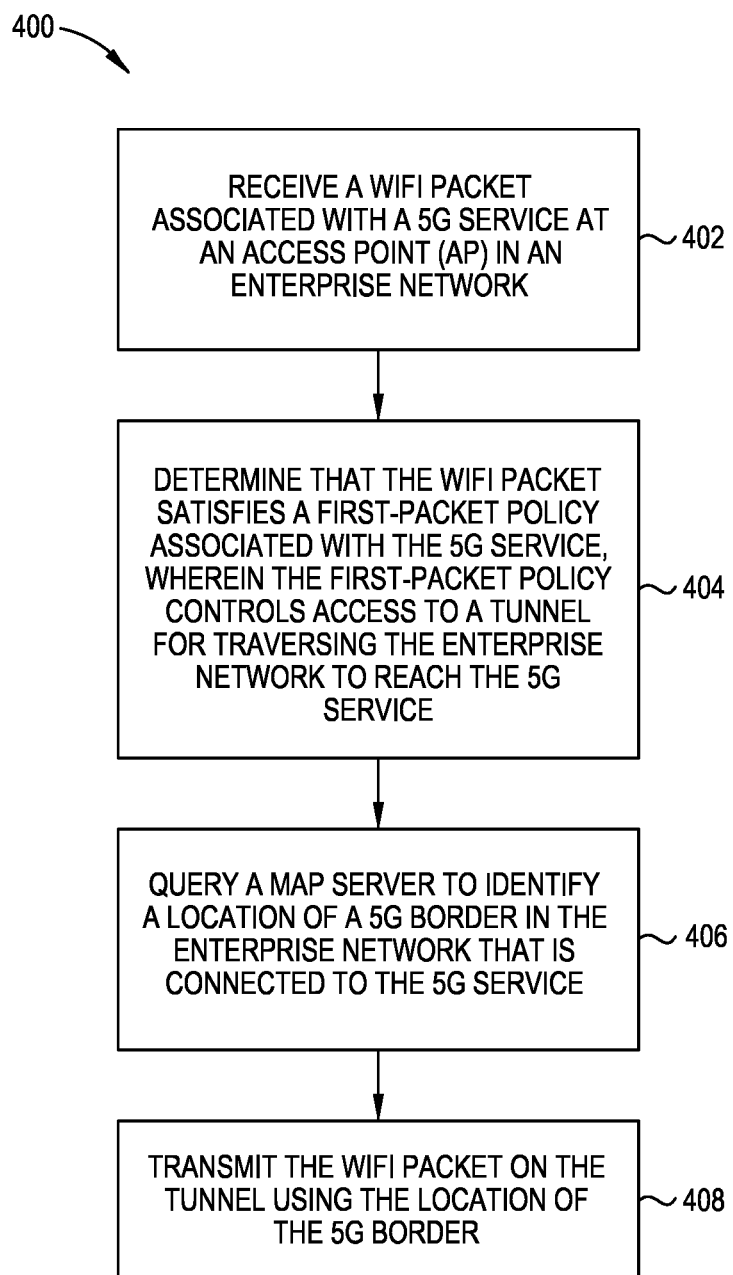
FIG. 4 illustrates example operations performed by an enterprise network, in accordance with certain aspects of the present disclosure.

FIG. 4 illustrates the example operation 400 performed by a communication system (e.g., the communication system 100 in FIG. 1). At 402, the enterprise network (e.g., the enterprise network 104 in FIG. 1) receives a WiFi packet associated with a 5G service (e.g., the 5G service 118 in FIG. 1) at a 5G access point (e.g., the 5G access point 112 in FIG. 1) in the enterprise network. This WiFi packet indicates its destination and its purpose for attempting to access the 5G service 118. The network controller (e.g., the network controller 108 in FIG. 1) communicates with the 5G border (e.g., the 5G border 110 in FIG. 1) and the 5G access point to determine if the WiFi packet can access the 5G service.

At 404, the map server (e.g., the map server 114 in FIG. 1) determines if the WiFi packet satisfies the first-packet policy associated with the 5G service. This first-packet policy controls access to a tunnel for traversing the enterprise network to reach the 5G service using parameters including wide area network link type and technologies, application identities, application access and authorization policies (e.g., a security group tag), any service legal agreements (e.g., bandwidth, packet delay, and packet drop parameters), and the destination of the packet.

At 406, the network controller queries the map server to identify a location of the 5G border in the enterprise network that is connected to the 5G service. This border is related to the 5G service and eventually grants the packet access to the 5G service. At 408, the WiFi packet is transmitted to the 5G service using the tunnel that is developed relying on the location of the 5G border. The WiFi packet then has access to 5G connectivity, no matter where the WiFi host is located (whether or not it is in the same location as where the enterprise network in operating).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving a WiFi packet associated with a 5G service at an access point (AP) in an enterprise network;
determining that the WiFi packet satisfies a first-packet policy associated with the 5G service, wherein the first-packet policy controls access to a tunnel for traversing the enterprise network to reach the 5G service;
identifying a location of a 5G border in the enterprise network that is connected to the 5G service; and
transmitting the WiFi packet, based on priority, on the tunnel using the location of the 5G border.

2. The method of claim 1, wherein a locator ID separation protocol (LISP) map server is used to identify the location of the 5G border.

3. The method of claim 2, further comprising, before receiving the WiFi packet:
registering an enterprise border connected to the enterprise network with the LISP map server as the 5G border; and
receiving a request at the LISP map server for the 5G border to set up the tunnel.

4. The method of claim 3, further comprising, before receiving the WiFi packet:
specifying, in the first-packet policy, at least one of: a type of device, a type of application generating the WiFi packet, or a user that can access the 5G service; and
at the LISP map server, receiving the first-packet policy from an enterprise network architecture.

5. The method of claim 4, further comprising, before receiving the WiFi packet:
requesting the first-packet policy from the LISP map server;
receiving a 5G border instance identification for the 5G service; and
creating the tunnel between egress and ingress tunnel routers.

6. The method of claim 5, further comprising clearing and disconnecting the LISP map server and the egress and ingress tunnel routers when no WiFi packets are detected over the tunnel.

7. The method of claim 6, further comprising:
withdrawing the AP from the tunnel; and
disconnecting the egress and ingress tunnel routers from the 5G border.

8. A computing system, comprising:
one or more processors; and
memory storing an application configured to, when executed by any combination of the one or more processors, perform an operation, the operation comprising:
receiving a WiFi packet associated with a service at an access point (AP) in an enterprise network, wherein the service is accessible using a different network than the enterprise network;
determining that the WiFi packet satisfies a first-packet policy associated with the service, wherein the first-packet policy controls access to a tunnel for traversing the enterprise network to reach the service;
identifying a location of a border in the enterprise network that is connected to the service; and
transmitting the WiFi packet, based on priority, on the tunnel using the location of the border.

9. The computing system of claim 8, wherein a locator ID separation protocol (LISP) map server is used to identify the location of the border.

10. The computing system of claim 9, wherein the operation further comprises, before receiving the WiFi packet:
registering an enterprise border connected to the enterprise network with the LISP map server as the border; and
receiving a request at the LISP map server for the border to set up the tunnel.

11. The computing system of claim 10, wherein the operation further comprises, before receiving the WiFi packet:
specifying, in the first-packet policy, at least one of: a type of device, a type of application generating the WiFi packet, or a user that can access the service; and
at the LISP map server, receiving the first-packet policy from an enterprise network architecture.

12. The computing system of claim 11, wherein the operation further comprises, before receiving the WiFi packet:
requesting the first-packet policy from the LISP map server;
receiving a border instance identification for the service; and
creating the tunnel between egress and ingress tunnel routers.

13. The computing system of claim 12, wherein the operation further comprises:
clearing and disconnecting the LISP map server and the egress and ingress tunnel routers when no WiFi packets are detected over the tunnel;
withdrawing the AP from the tunnel; and
disconnecting the egress and ingress tunnel routers from the border.

14. The computing system of claim 8, wherein the different network comprises one of: a cellular network or a fiber or cable network.

15. A non-transitory computer readable medium having program instructions embodied therewith, the program instructions executable by any combination or one or more processors to perform an operation, the operation comprising:
receiving a WiFi packet associated with a service at an access point (AP) in an enterprise network, wherein the service is accessible using a different network than the enterprise network;
determining that the WiFi packet satisfies a first-packet policy associated with the service, wherein the first-packet policy controls access to a tunnel for traversing the enterprise network to reach the service;
identifying a location of a border in the enterprise network that is connected to the service; and
transmitting the WiFi packet, based on priority, on the tunnel using the location of the border.

16. The non-transitory computer readable medium of claim 15, wherein a locator ID separation protocol (LISP) map server is used to identify the location of the border.

17. The non-transitory computer readable medium of claim 16, wherein the operation further comprises, before receiving the WiFi packet:
  registering an enterprise border connected to the enterprise network with the LISP map server as the border; and
  receiving a request at the LISP map server for the border to set up the tunnel.

18. The non-transitory computer readable medium of claim 17, wherein the operation further comprises, before receiving the WiFi packet:
  specifying, in the first-packet policy, at least one of: a type of device, a type of application generating the WiFi packet, or a user that can access the service; and
  at the LISP map server, receiving the first-packet policy from an enterprise network architecture.

19. The non-transitory computer readable medium of claim 18, wherein the operation further comprises, before receiving the WiFi packet:
  requesting the first-packet policy from the LISP map server;
  receiving a border instance identification for the service; and
  creating the tunnel between egress and ingress tunnel routers.

20. The non-transitory computer readable medium of claim 19, wherein the operation further comprises clearing and disconnecting the LISP map server and the egress and ingress tunnel routers when no WiFi packets are detected over the tunnel.

* * * * *